United States Patent [19]

Carossino

[11] Patent Number: 4,500,081
[45] Date of Patent: Feb. 19, 1985

[54] CLAMP APPARATUS, ESPECIALLY FOR CLAMPING A PART ONTO A MACHINE TOOL

[75] Inventor: André Carossino, Louveciennes, France

[73] Assignee: Carossino Freres, France

[21] Appl. No.: 564,844

[22] Filed: Dec. 23, 1983

[30] Foreign Application Priority Data

Jan. 5, 1983 [FR] France .............. 83 00072

[51] Int. Cl.³ .............................................. B23Q 3/02
[52] U.S. Cl. ....................................... 269/93; 269/94; 269/100; 269/226
[58] Field of Search .................. 269/91, 93–94, 269/99–101, 238, 225, 226, 285, 250–253; 308/3.5; 82/32, 34 R

[56] References Cited

U.S. PATENT DOCUMENTS

| 2,395,242 | 2/1946 | Anderson | 269/226 |
| 3,865,360 | 2/1975 | Schweidler | 269/100 |
| 4,310,270 | 1/1982 | Kraus | 82/32 |

FOREIGN PATENT DOCUMENTS 345199 12/1921 Fed. Rep. of Germany ........ 269/94
3102800 7/1982 Fed. Rep. of Germany ........ 269/93

Primary Examiner—Robert C. Watson
Attorney, Agent, or Firm—Andrus, Sceales, Starke & Sawall

[57] ABSTRACT

A clamp for clamping parts on cutting machine tools includes a housing containing a rotary disc having a clamp arm and a toothed sector projecting from the disc which meshes with a tangential screw which rotates the disc to apply a clamping force to the clamp arm. The disc is journalled in a pair of cheek members that are fixed within the housing, and cooperate with the disc to present cylindrical radial bearing surfaces and planar annular lateral bearing surfaces. The annular lateral bearing surfaces of the disc are contiguous with the cylindrical outer surface of the disc on which a pair of scraper blades run, and the annular lateral bearing surfaces of the cheeks are substantially flush with the inner wall of the housing so as to protect the housing against ingress of foreign matter. The diameter of the outer cylindrical surface portion of the disc is less than the inner diameter of the toothed sector to enable a fixing screw to be accessible by a tool from the top of the housing.

6 Claims, 3 Drawing Figures

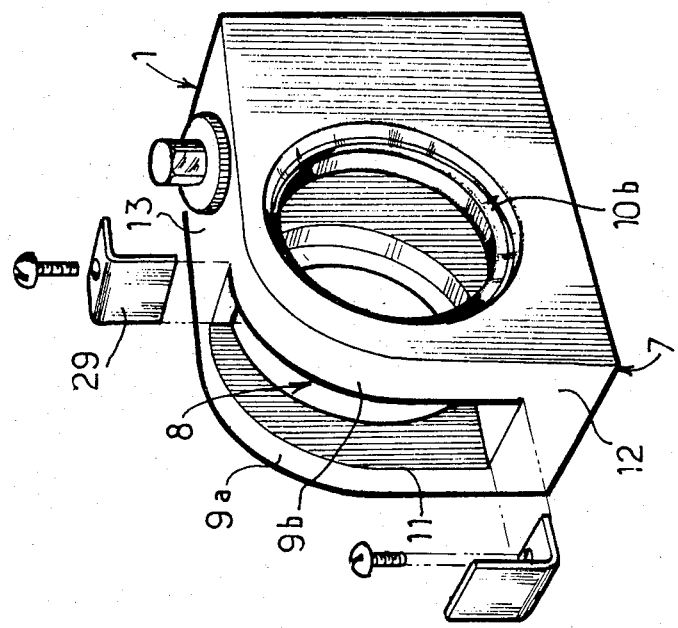
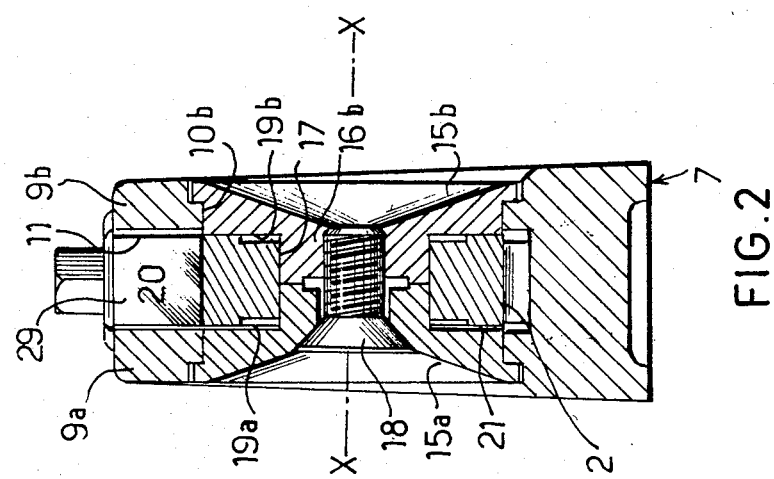

CLAMP APPARATUS, ESPECIALLY FOR CLAMPING A PART ONTO A MACHINE TOOL

BACKGROUND OF THE INVENTION

The present invention relates to clamp apparatus of the kind comprising a housing presenting a base, a disc journalled within the housing for rotation about an axis parallel to the base in cylindrical radial bearings solid with the housing, the disc being provided with a clamp arm projecting through a slit in a wall of the housing above the base, the slit being juxtaposed with the disc, and the disc being provided with a toothed sector generally diametrically opposite to the clamp arm and cooperating with a tangential screw disposed in the housing substantially perpendicular to the base, a fixing member on the base for fixing the housing to its support on the machine tool, and a scraper blade disposed on the opposite face of the housing juxtaposed with the circumference of the housing to close the housing against ingress of foreign matter.

DESCRIPTION OF THE PRIOR ART

French Pat. No. 72 02940 (Publication No. 2 169 516) of the present inventor describes a clamp apparatus having a structure of this kind, apart from the scraper blade, which has been added since with a view to usage of the apparatus in machining operations involving removal of material, with a view to avoiding penetration of swarf into the housing, since swarf would hinder the operation of the apparatus and even block it completely.

This apparatus was designed to achieve high clamp forces when clamping a part onto a support, the clamp force being up to 3 or 4 tonnes, when it is improved according to another French Patent of the present inventor No. 77 07067 (Publication No. 2 382 976), simply by using a spanner engaging the head of the tangential screw.

In apparatus of this kind, the two side faces of the disc present annular zones forming lateral bearing surfaces, whose radial extent is determined so that the corresponding bearing area has a desired value fixed by the designer.

Now, in the prior apparatus, the cylindrical radial bearing is formed, at least in part, by a projecting circular cheek which fits into the thickness of the size wall of the housing, the radial bearing forming a shoulder relative to the surface of the cheek which faces the disc. Generally, the radial bearing is formed on two side cheeks of this kind, disposed in opposite walls of the housing facing and contacting each other.

In this arrangement, the lateral bearings of the disc, which form a corner relative to the circumference of the disc from which the clamp arm and toothed sector project, are disposed radially to face partly the cheeks and partly the inner wall of the housing. It follows that the scraper blade, which is juxtaposed to the circumference of the disc extends laterally on each side beyond the disc to contact the inner walls of the housing leaving between the inner faces of these walls, the corners of the disc and the scraper blade, two passages whose size is significant compared to typical swarf. Accordingly, in spite of the presence of the scraper blade, the swarf can penetrate into the housing and damage the drive mechanism formed by the toothed wheel and the tangential screw, hindering the movement of the mechanism and even jamming it, with a risk of breaking teeth, and this damage to the mechanism can lead to the apparatus being scrapped.

Moreover, in these known apparatus, the fixing member which projects beneath the base of the housing to fix it to the desired support is secured to the housing by passing through the base of the housing. The fixing member comprises a threaded shank engaging in a tapped hole in the base of the housing and its outer end either receives a slider which fits into a "T" groove of the machine tool bed or engages in a support plate serving as assembly plane. Screwing up or unscrewing the threaded shank enables the height of the slider to be adjusted relative to the base of the housing and consequently enables the slider to be positioned to suit the depth of the groove in the table.

It is important for a clamp apparatus to increase as far as possible the reach of the clamp arm, that is to say the distance it projects from the housing, so that it can be applied to more remote clamp zones on the part, since the clamp zones available may be remote, especially on certain very complicated parts. It follows that the size of the housing has been reduced as much as possible in the direction of the clamp arm, so that the hole receiving the fixing member is disposed as closed as possible to the rotating disc, and the face of the housing which presents the slit through which the clamp arm moves is itself positioned as close as possible to this hole.

In the case where the clamp is to be used on the bed of a machine tool, a spring acting against the base of the housing holds the slider against the head of a bolt whose threaded shank is screwed into a tapped and shouldered bush which is accommodated in the hole in the housing and engages inside the thickness of the base. The adjustment of the height of the slider is made before it is positioned in its groove, the hexagonal hollow head being turned by a hexagonal key. However, once the slider is engaged in the groove, it is no longer possible to tighten the bolt, and it is not possible to lock the housing against rotation around the bolt. Moreover, when the clamp is used on an assembly plate, it is often impossible to gain access to the underneath of the plate, because of lack of space, and the same problem then arises. Again, in the case mentioned above of usage on a grooved table it is not possible to hold the housing in an oblique position, because of the absence of locking against rotation, although such an oblique position would often be desirable.

OBJECT OF THE INVENTION

An object of the present invention is to alleviate some or all of the above disadvantages, and to provide a clamp apparatus which is better protected against ingress of foreign matter. Another object of the invention is to provide a clamp which can be locked in an oblique position even when the underneath is inaccessible.

BRIEF DESCRIPTION OF THE INVENTION

The present invention provides a clamp apparatus comprising a housing presenting a base and a wall fixing means projecting from said base for fixing said housing to a support, said housing containing a disc mounted in said housing for rotation about an axis parallel to said base, at least one cheek member mounted in said wall, said cheek member and said disc presenting cooperating generally cylindrical radial bearing surfaces and cooperating generally planar annular lateral bearing surfaces, a clamp arm projecting from said disc through an aperture in said wall for engaging a part to be clamped, a toother sector solid with said disc at a portion thereof generally diametrally opposite to said arm, screw means mounted in said housing and cooperating radially with said toothed sector whereby to rotate said disc and said clamp arm, said disc presenting at least one outer cylindrical surface portion between said clamp arm and said toothed sector, and at least one scraper blade juxtaposed with said wall and said outer cylindrical surface portion whereby to close substantially a gap between said outer cylindrical surface portion and said wall, wherein said annular lateral bearing surface of said disc and said outer cylindrical surface portion are substantially contiguous, and said annular lateral bearing surface of said cheek member is disposed at least approximately flush with the inner surface of said wall.

In this way the outer cylindrical surface portion and the annular lateral bearing surface of the disc form a corner which is close to the inner surface of the housing wall, with only a small clearance enabling the disc to be inserted through the aperture in the wall which accommodates the arm on assembly of the apparatus, so that there is no significant passage at the corner of the scraper blade with the disc, the cheek member and the housing wall through which foreign matter can pass.

Preferably, the base diameter of said toothed sector is substantially greater than the diameter of said outer cylindrical surface portion, and said fixing means comprises screw means disposed on the same side of said disc as said arm and extending through said base, said screw means presenting a head for engagement by a tool above said base when said housing is disposed on said support.

In prior clamps, the diameter of the outer cylindrical surface portion is substantially equal to the base diameter of the toothed sector and the fixing means is not accessible above the base to a tool. The reduction in diameter of the outer cylindrical surface portion of the disc, and hence of the annular lateral bearing surface, may be obtained without reduction of the lateral bearing area, by reducing the diameter of the radial bearing surfaces.

The toothed sector advantageously has a large radius giving a big lever ratio on the clamp member through the tangential screw, and hence a high clamp force. However, the reduced diameter of the outer cylindrical surface portions of the disc enable the fixing screw means to be accessed by a tool, without reducing the reach of the clamp arm, so that the housing can be locked on the support or set obliquely, without access to the underneath of the support.

The screw means preferably engages threadingly either in a slider which fits in a "T" groove in the support, or directly in a threaded hole in the support.

Preferably, said scraper blade presents a height which is substantially equal to the spacing between said wall and said outer cylindrical surface portion, the spacing between said toothed sector and said wall in the vicinity of said scraper blade being relatively small.

Advantageously, said base presents a portion of greater thickness in the vicinity of said fixing means, on which a further said scraper blade is secured and cooperates with a further said outer cylindrical surface portion of said disc whereby to close substantially a gap between said further outer cylindrical surface portion and said base.

Other features and advantages of the invention will appear from the following description, given by way of example, with reference to the accompanying drawings, in which:

FIG. 2 is a transverse sectional view of the apparatus taken on the line 2—2 of FIG. 1, and FIG. 3 is a perspective view of a housing in the apparatus, with two scraper blades shown in exploded position.

Figure 1:
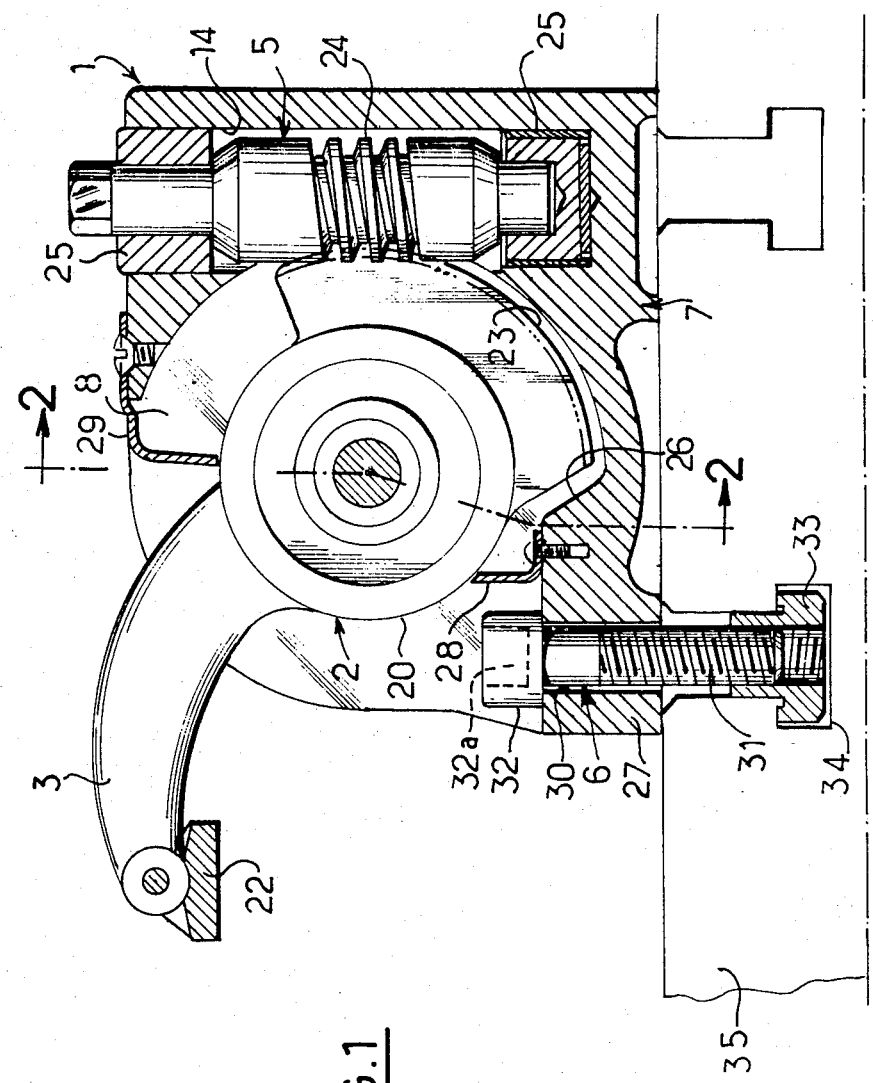
FIG. 1 is a sectional elevational view taken on its plane of symmetry of a clamp apparatus according to an embodiment of the invention.

The clamp apparatus shown in the drawings comprises a housing 1 in which is disposed a disc 2 provided with a clamp arm 3 and a toothed sector 4 meshing with a tengential screw 5, the housing also being provided with an anchor member 6.

The housing 1 comprises a parallelepiped block presenting a lower or base surface 7 and an inner cavity 8 within which the disc 2 is journalled about an axis X—X parallel to the base surface 7 and perpendicular to two parallel walls 9a, 9b of the housing, which define the sides of the cavity. In the two walls 9a, 9b are formed two apertures 10a, 10b of large diameter circular section, centred on the axis X—X and presenting a shouldered cylindrical shape, with the larger diameter at the outer side. Besides these two apertures, through which it opens to the exterior, the cavity 8 also opens through the front face and part of the top face of the housing by a wide curved slit 11, the front face 12 curving along a cylindrical surface to connect with the top face 13 of the housing, matching the shape of the apertures 10a, 10b on a larger diameter.

At the rear, opposite the front face 12, the cavity 8 is defined by two part-cylindrical surfaces centred on the axis X—X, which correspond to the upper and lower walls and which are separated by a passage communicating between the cavity and a blind vertical large diameter hole 14 which accommodates the screw 5.

In the two side apertures 10a and 10b are disposed two cheeks 15a and 15b presenting a similar complementary shouldered shape as the apertures so as to fit precisely in the apertures, the two cheeks also presenting at their centres two cylindrical studs 16a, 16b which abut against each other so as to form together a cylindrical radial bearing 17. The two cheeks which can be made lighter as shown by relieving their outer surfaces in a part-conical shape, are pressed together by a transverse bolt 18 passing freely through one stud and screwed into the other.

The cylindrical bearing assembly formed by the studs 16a and 16b has a reduced diameter compared with the average diameter of the main part of the cheeks 10a, 10b, for example of the order of half the diameter, and its width corresponds very exactly to the width of the slit 11 in the housing, so that the two annular surfaces 19a and 19b of the two cheeks surrounding the studs 16a and 16b are practically flush with the inner faces 9a and 9b of the housing which define the slit 11. These two annular surfaces 19a and 19b form the lateral bearing surfaces for the disc 2.

The disc 2 has a full annular shape presenting a cylindrical outer running surface 20 whose diameter corresponds substantially to the smaller diameter of the shouldered surface of the cheeks, and a cylindrical inner surface by which it engages rotatably on the cylindrical bearing surface 17 of the studs 16a and 16b.

The two annular side surfaces of the disc 2 facing the lateral bearing surfaces 19a and 19b of the cheeks are each shouldered to present an annular outer surface (on a larger diameter) 21, which projects slightly beyond the annular inner surface, the outer surface 21 forming a lateral bearing surface cooperating with that on the juxtaposed cheek. This bearing surface is contiguous, along a circular edge, with the running outer surface 20 of the disc, and the width of the disc between the two bearing surfaces 21 corresponds to the width of the slit 11, that is to say the spacing between the two walls 9a 9b of the housing apart only from a very small assmebly clearance which enables the disc to be introduced into the cavity 8 through the slit 11 before the cheeks are assembled to it.

The clamp arm 3 projects forwards and upwards at the front face 12 of the housing, extending generally radially but curved downwards, the arm 3 being formed in one piece with the disc 2 and having a width which is smaller than the width of the disc by an amount which is small, but very substantially greater than the assembly clearance referred to above, which is extremely small. At its free end, the arm 3 bears a hinged shoe 22 which is designed to press on the part to be clamped (not shown).

The toothed sector 4 is disposed generally diametrically opposite to the arm 3 and is also formed in one piece with the disc 2; the sector 4 extends over an angle of 120° for example and, like the arm 3, its width is substantially less than the disc 2. The teeth 23 on the sector can move freely to and fro within the part cylindrical surfaces of the cavity 8 corresponding to the upper and lower walls, the teeth 23 cooperating with the thread 24 of the screw 5, which is journalled vertically in two bearings 25 disposed at the bottom of the blind hole 14 and at the upper wall 13 of the housing.

The inner diameter at the base of the teeth 23 of the sector is substantially greater than that of the outer surface 20 of the disc, for example half as much again as the diameter of the running surface of the disc. When the arm 3 is in its raised position as shown in FIG. 1, the toothed sector 4 being at its lowest position, the lower flank connecting the sector with the disc is disposed facing an inclined flank 26 which separates the lower wall 7 of normal thickness, beneath the sector 4, from the thickened front part 27, whose flat upper surface is disposed slightly below the level of the bottom of the disc 2. On the top surface of the front part 27 an angle scraper blade 28 is fixed by a screw just in front of the inclined flank 26 (which is substantially underneath the axis X—X), the blade 28 presenting an upstanding wing having a sharp edge juxtaposed with the running surface 20 of the disc. This blade 28 extends over the same width as the outer part of the disc between its two lateral annular bearing surfaces 21, so that it leaves no passage, however small, along the sharp edge at the sides of the blade.

Also, right above the axis X—X, a second angled scraper blade 29 is fixed to the upper wall 13 of the housing by a screw, and its depending wing presents a sharp edge juxtaposed with the running surface 20 of the disc, blade 29 also having the same width as the spacing between the lateral bearing surfaces of the disc.

Thus, when used in a machining operation involving removal of material, no swarf can penetrate above or below the arm 3 to hinder the operation of the mechanism comprising the toothed sector 4 and the tangential screw 5.

The thickened part defined by the inclined flank 26 at the front of the lower wall 7 of the housing has a hole 30 drilled through it perpendicular to the lower wall 7 and disposed just in front of the position of the front of the disc 2. A threaded shank 31 is accommodated freely in the hole 30 and presents at the top a hollow hexagonal head 32a bearing on the edge of the hole 30, while the threaded shank projecting beneath the wall 7 screws into a "T"-section slider 33 which engages in a groove 34 of corresponding shape in the bed or table 35 of the machine tool on which the part (not shown) is to be clamped by the arm 3 and its foot 22 in front of the housing 1. The slider can be adjusted for height, since it is directly screwed on the threaded shank 31, so that it can easily be fitted to the depth of the groove 34, and also a hexagonal key can be engaged in the head 32 to tighten and lock the shank, and immobilise the housing 1 on the table 35 against rotation.

I claim:

1. Clamp apparatus comprising a housing presenting a base and a wall, fixing means projecting from said base for fixing said housing to a support, said housing containing a disc mounted in said housing for rotation about an axis parallel to said base, at least one fixed cheek member mounted in said wall, said cheek member and said disc presenting cooperating generally cylindrical radial bearing surfaces and cooperating generally planar annular lateral bearing surfaces, a clamp arm projecting from said disc through an aperture in said wall for engaging a part to be clamped, a toother sector solid with said disc at a portion thereof generally diametrally opposite to said arm, screw means mounted in said housing and cooperating radially with said toothed sector whereby to rotate said disc and said clamp arm, said disc presenting at least one outer cylindrical surface portion between said clamp arm and said toothed sector, and at least one scraper blade juxtaposed with said wall and said outer cylindrical surface portion whereby to close substantially a gap between said outer cylindrical surface portion and said wall, wherein said annular lateral bearing surface of said disc and said outer cylindrical surface portion are substantially contiguous, and said annular lateral bearing surface of said cheek member is disposed at least approximately flush with the inner surface of said wall.

2. Apparatus as claimed in claim 1, wherein the inner diameter of said toothed sector is substantially greater than the diameter of said outer cylindrical surface portion, and said fixing means comprises screw means disposed on the same side of said disc as said arm and extending through said base, said screw means presenting a head for engagmnt by a tool above said base when said housing is disposed on said support.

3. Apparatus as claimed in claim 2, wherein said screw means comprises a threaded shank passing freely through said base for screw engagement in a member beneath said base.

4. Apparatus as claimed in claim 3, wherein said member beneath said base comprises a slider for engaging in a groove in said support.

5. Apparatus as claimed in claim 2, wherein said scraper blade presents a height which is substantially equal to the spacing between said wall and said outer cylindrical surface portion, the spacing between said toothed sector and said wall in the vicinity of said scraper blade being relatively small.

6. Apparatus as claimed in claim 2, wherein said base presents a portion of greater thickness in the vicinity of said fixing means, on which a further said scraper blade is secured and cooperates with a further said outer cylindrical surface portion of said disc, whereby to close substantially a gap between said further outer cylindrical surface portion and said base.

* * * * *